United States Patent
Kamimae et al.

(10) Patent No.: US 9,487,078 B2
(45) Date of Patent: Nov. 8, 2016

(54) VEHICLE BODY COVER AND WORK VEHICLE

(71) Applicant: KOMATSU LTD., Tokyo (JP)

(72) Inventors: Takeshi Kamimae, Kanazawa (JP);
Yutaka Tanaka, Komatsu (JP);
Norihito Bando, Komatsu (JP);
Kazunori Kamei, Kanazawa (JP);
Kenji Hiraoka, Hitachinaka (JP);
Yasufumi Ohchi, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/761,675

(22) PCT Filed: Sep. 4, 2014

(86) PCT No.: PCT/JP2014/073328
§ 371 (c)(1),
(2) Date: Jul. 17, 2015

(87) PCT Pub. No.: WO2015/079764
PCT Pub. Date: Jun. 4, 2015

(65) Prior Publication Data
US 2016/0068058 A1   Mar. 10, 2016

(51) Int. Cl.
*B60K 11/08* (2006.01)
*B60K 11/06* (2006.01)
*B60K 13/04* (2006.01)
*B62D 25/12* (2006.01)

(52) U.S. Cl.
CPC .............. *B60K 11/08* (2013.01); *B60K 11/06* (2013.01); *B60K 13/04* (2013.01); *B62D 25/12* (2013.01); *B60Y 2200/415* (2013.01)

(58) Field of Classification Search
None
See application file for complete search history.

(56) References Cited

U.S. PATENT DOCUMENTS

| | | | |
|---|---|---|---|
| 8,936,128 B2 * | 1/2015 | Numa | F01N 3/2066 180/309 |
| 2002/0017408 A1 * | 2/2002 | Oshikawa | B60K 11/08 180/69.2 |

(Continued)

FOREIGN PATENT DOCUMENTS

| | | |
|---|---|---|
| JP | 49-38136 B1 | 10/1974 |
| JP | 51-36830 U | 3/1976 |

(Continued)

OTHER PUBLICATIONS

The extended European Search Report for the corresponding European application No. 14865790, issued on Dec. 17, 2015.

(Continued)

*Primary Examiner* — John Walters
*Assistant Examiner* — Hilary L Johns
(74) *Attorney, Agent, or Firm* — Global IP Counselors, LLP

(57) ABSTRACT

A vehicle body cover of a work vehicle is provided with an outside ventilation cover part and an inside ventilation cover part. The outside ventilation cover part has outside ventilation holes that communicate with an external space. The outside ventilation cover part is disposed in an inclined manner with respect to the vertical direction. The inside ventilation cover part is disposed to face the outside ventilation holes on the inside of the outside ventilation cover part. The inside ventilation cover part has a rain gutter part and a ventilation part. The rain gutter part is configured to receive water entering from the outside ventilation holes. The ventilation part has inside ventilation holes that communicate with a space on the inside of the inside ventilation cover part. The ventilation part is disposed above the rain gutter part.

16 Claims, 12 Drawing Sheets

(56) References Cited

U.S. PATENT DOCUMENTS

| | | | |
|---|---|---|---|
| 2003/0017798 A1* | 1/2003 | Hanaya | B60K 15/035 |
| | | | 454/147 |
| 2012/0224942 A1 | 9/2012 | Cherney et al. | |
| 2013/0302720 A1* | 11/2013 | Ozawa | B60K 1/04 |
| | | | 429/513 |
| 2014/0238767 A1* | 8/2014 | Numa | F01N 3/2066 |
| | | | 180/309 |

FOREIGN PATENT DOCUMENTS

| JP | 51-158513 U | 12/1976 |
|---|---|---|
| JP | 61-151138 U | 9/1986 |
| JP | 11-83102 A | 3/1999 |
| JP | 2002-21565 A | 1/2002 |
| JP | 5329009 B1 | 10/2013 |
| JP | 5460931 B1 | 4/2014 |

OTHER PUBLICATIONS

The International Search Report for the corresponding international application No. PCT/JP2014/073328, issued on Sep. 4, 2014.
The Office Action for the corresponding Japanese application No. 2015-515320, issued on May 17, 2016.

* cited by examiner

VEHICLE BODY COVER AND WORK VEHICLE

CROSS-REFERENCE TO RELATED APPLICATIONS

This application is a U.S. National stage application of International Application No. PCT/JP2014/073328, filed on Sep. 4, 2014.

BACKGROUND

1. Field of the Invention

The present invention relates to a vehicle body cover and a work vehicle.

2. Description of the Related Art

Ventilation holes are provided to allow for ventilation in a vehicle body cover of a work vehicle. For example, the vehicle in Japanese Patent Laid-open No. 2002-21565 is configured so that ventilation holes are provided on the side surface of the engine room and outdoor air for cooling is drawn into the engine room through the ventilation holes.

SUMMARY

The operator of a work vehicle operates a work implement or drives the vehicle while observing the area around the vehicle. Therefore, a good field of vision is desired for a work vehicle. On the other hand, the shape of the vehicle body cover affects the field of view. For example, blind spots can be reduced and the field of view can be improved by providing a portion of the vehicle body cover with an inclined shape.

However, when the above mentioned ventilation holes are provided in the inclined vehicle body cover, water from rain and the like may enter the inside of the vehicle body cover from the ventilation holes. As the inclination angle with respect to the vertical direction of the vehicle body cover increases, the field of view can be correspondingly improved. However, there is a problem that in doing so water is more likely to enter through the ventilation holes.

An object of the present invention is to provide a work vehicle and a vehicle body cover having good ventilation and an improved field of view while suppressing the intrusion of water to the inside of the vehicle.

A vehicle body cover of a work vehicle according to a first aspect of the present invention is provided with an outside ventilation cover part and an inside ventilation cover part. The outside ventilation cover part has outside ventilation holes that communicate with an external space. The outside ventilation cover part is disposed in an inclined manner with respect to the vertical direction. The inside ventilation cover part is disposed to face the outside ventilation holes on the inside of the outside ventilation cover part. The inside ventilation cover part has a rain gutter part and a ventilation part. The rain gutter part is configured to receive water entering from the outside ventilation holes. The ventilation part has inside ventilation holes that communicate with a space on the inside of the inside ventilation cover part. The ventilation part is disposed above the rain gutter part.

The outside ventilation cover part is disposed in an inclined manner with respect to the vertical direction in the vehicle body cover of the work vehicle according to the present exemplary embodiment. Accordingly, the field of view can be improved. Moreover, outdoor air is able to pass through the outside ventilation holes of the outside ventilation cover part and the inside ventilation holes of the ventilation part and flow to the inside of the vehicle body cover. Alternatively, air inside the vehicle body cover is able to pass through the inside ventilation holes of the ventilation part and the outside ventilation holes of the outside ventilation cover part to flow out to the outside of the vehicle body cover. As a result, good ventilation can be achieved. Furthermore, even when water enters from the outside ventilation holes, the water is received by the rain gutter part. Because the ventilation part is disposed above the rain gutter part, even when water enters from the outside ventilation holes, the water is not likely to enter through the inside ventilation holes of the ventilation part. As a result, the intrusion of water inside the vehicle body cover can be suppressed.

The outside ventilation cover part preferably has an inclined surface part that includes the outside ventilation holes and an eave part that covers the outside ventilation holes from the outside. In this case, the intrusion of water from the outside ventilation holes can be suppressed.

The inclined surface part and the eave part are preferably formed in an integrated manner. In this case, the outside ventilation cover part can be formed easily with press manufacturing for example.

The rain gutter part is preferably disposed to overlap the outside ventilation holes as seen in a plan view. In this case, water entering from the outside ventilation holes can be easily received by the rain gutter part.

The ventilation part is preferably disposed to overlap the outside ventilation holes as seen in the horizontal direction. In this case, even when water enters from the outside ventilation holes, the water is less likely to enter through the inside ventilation holes of the ventilation part. Moreover, ventilation can be improved because the air can pass easily through the outside ventilation holes and the inside ventilation holes.

The outside ventilation cover part preferably has a draining hole that communicates with a space between the rain gutter part and the outside ventilation cover part. In this case, water that enters from the outside ventilation hole and is received by the rain gutter part can be discharged easily to the outside through the draining hole.

The rain gutter part is preferably disposed to be inclined downward toward the outside ventilation cover part. In this case, water that enters from the outside ventilation hole and is received by the rain gutter part can be discharged easily to the outside through the draining hole.

The space between the outside ventilation cover part and the inside ventilation cover part is preferably open at the side surfaces of the outside ventilation cover part and the inside ventilation cover part. In this case, the space between the outside ventilation cover part and the inside ventilation cover part can be accessed easily from the openings at the side surfaces of the outside ventilation cover part and the inside ventilation cover part. As a result, maintenance performance of the vehicle body cover can be improved. For example, a nozzle for cleaning can be easily inserted into the space between the outside ventilation cover part and the inside ventilation cover part from the opening. As a result, foreign matter that enters the space between the outside ventilation cover part and the inside ventilation cover part can be easily removed.

The ventilation part preferably has a plurality of ventilation holes that includes the inside ventilation holes. In this case, ventilation can be further improved.

The inside ventilation cover part preferably further has a guiding member connected to the inside ventilation hole. The guiding member guides the flow of air through the inside ventilation holes to the inside of the inside ventilation cover part. In this case, outdoor air can be led to a desired location by the guiding member. For example, by guiding air with the guiding member to a device that requires cooling, the device can be cooled effectively.

A plate-like member is preferably further disposed between the outside ventilation hole and the inside ventilation hole. In this case, even when water enters from the outside ventilation holes, the plate-like member functions as a baffle plate and the water is less likely to enter through the inside ventilation holes. As a result, the intrusion of water to the inside of the vehicle body cover can be suppressed even when the size of the inside ventilation holes is increased. Ventilation can be improved by increasing the size of the inside ventilation holes. As a result, by guiding more air to a device that requires cooling for example, the device can be cooled more effectively.

The vehicle body cover is preferably further provided with a first exterior cover. The first exterior cover has an opening and is disposed in an inclined manner with respect to the vertical direction. The first exterior cover is preferably separate from the outside ventilation cover part. The outside ventilation cover part and the inside ventilation cover part are preferably integrated with each other to be configured as a ventilation cover unit. The ventilation cover unit is preferably attached to the first exterior cover and closes the opening.

In this case, the inside ventilation cover part and the outside ventilation cover part can be detached from the vehicle body easily by detaching the ventilation cover unit from the first exterior cover. As a result, maintenance performance can be improved.

The vehicle body cover is preferably further provided with a second exterior cover. The second exterior cover is disposed under the outside ventilation cover part and is disposed in an inclined manner with respect to the vertical direction. The inclination angle with respect to the vertical direction of the outside ventilation cover part is preferably greater than the inclination angle with respect to the vertical direction of the second exterior cover.

In this case, the inclination angle with respect to the vertical direction of the outside ventilation cover part disposed above the second exterior cover is larger than the inclination angle with respect to the vertical direction of the second exterior cover. In this case, the field of view can be further improved.

A work vehicle according to another aspect of the present invention is provided with the above vehicle body cover. The work vehicle according to the present exemplary embodiment has good ventilation and an improved field of view while suppressing the intrusion of water to the inside of the vehicle.

The work vehicle is preferably further provided with a cab, an engine room, an engine, a first exhaust processing device, and a second exhaust processing device. The engine room has the vehicle body cover and is disposed to the rear of the cab. The engine is disposed inside the engine room. The first exhaust processing device is disposed over the engine. The second exhaust processing device is disposed over the engine.

In this case, the temperature inside the engine room can be reduced due to the proper ventilation of the engine room. Moreover, even when the size of the engine room is increased to increase the size of the space inside the engine room, the outside ventilation cover part is disposed in an inclined manner with respect to the vertical direction whereby a good field of view can be achieved. Moreover, the intrusion of water to the inside of the engine room can be suppressed by the inside ventilation cover part even when the outside ventilation cover part is inclined.

According to the present invention, good ventilation and an improved field of view can be achieved while suppressing the intrusion of water to the inside of the vehicle in the vehicle body cover of the work vehicle.

DESCRIPTION OF EXEMPLARY EMBODIMENTS

Figure 1:
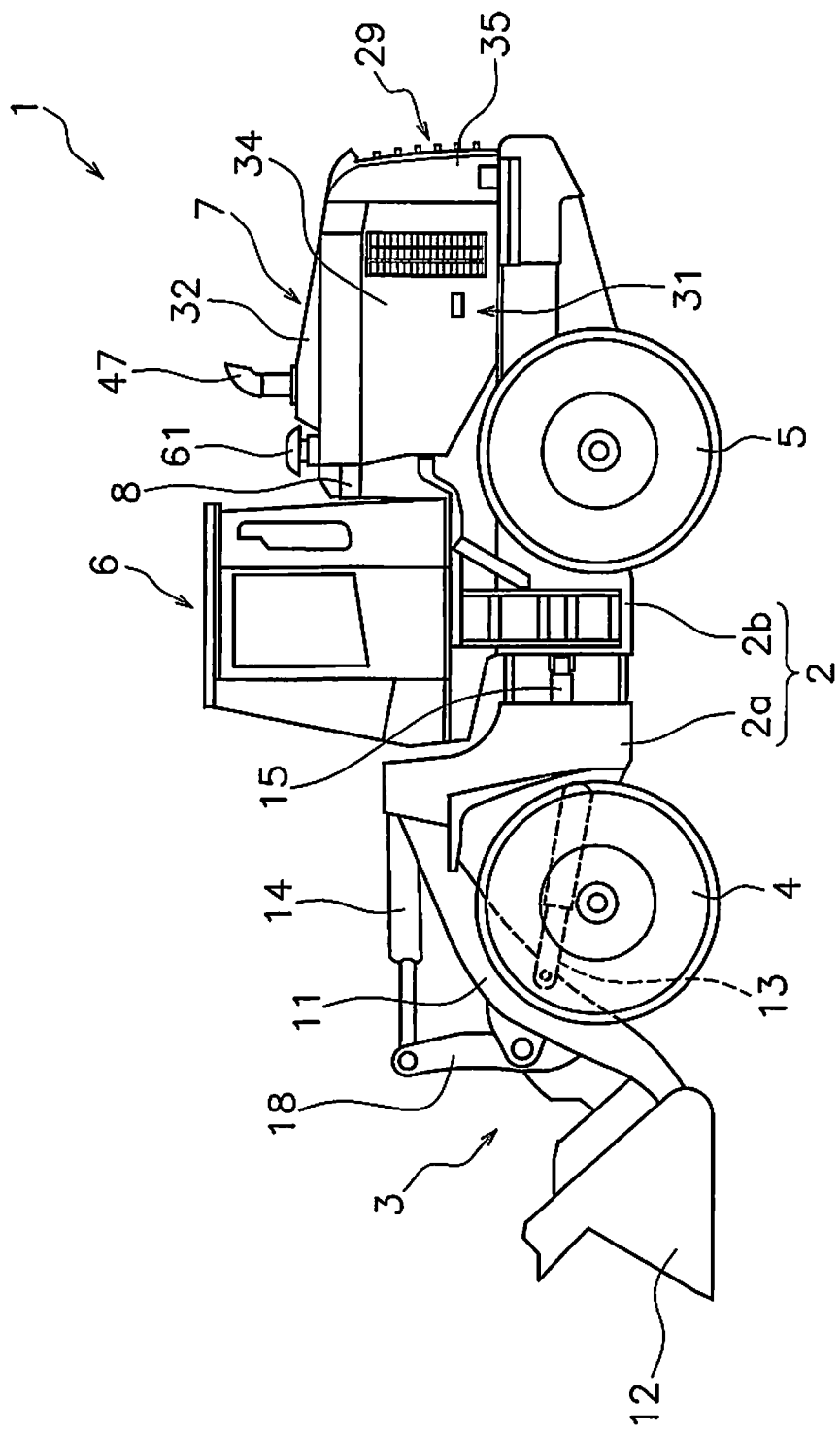
FIG. 1 is a side view of a wheel loader according to an exemplary embodiment.

The following is a description of a work vehicle 1 according to the present embodiment with reference to the drawings. FIG. 1 is a side view of the work vehicle 1 according to the present exemplary embodiment. The work vehicle 1 is a wheel loader in the present exemplary embodiment. As illustrated in FIG. 1, the work vehicle 1 is equipped with a vehicle body frame 2, a work implement 3, traveling wheels 4 and 5, and a cab 6. The work vehicle 1 travels by rotating and driving the traveling wheels 4 and 5. The work vehicle 1 is able to carry out work, such as excavation, by using the work implement 3.

The work implement 3 is attached to the vehicle body frame 2. The work implement 3 is driven by hydraulic fluid from a hydraulic fluid pump which is not illustrated. The work implement 3 has a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 due to hydraulic fluid from the hydraulic pump. The bucket 12 is attached to the tip of the boom 11. One end of the bucket cylinder 14 is attached to the vehicle body frame 2. The other end of the bucket cylinder 14 is attached to a tilt arm 18. The bucket cylinder 14 drives the bucket 12 via the tilt arm 18 and a tilt rod which is not illustrated. The bucket 12 swings up and down due to the extension and contraction of the bucket cylinder 14 due to hydraulic fluid from the hydraulic pump.

The cab 6 and the traveling wheels 4 and 5 are attached to the vehicle body frame 2. The cab 6 is disposed on the vehicle body frame 2. A seat for the operator and a below mentioned operating device and the like are disposed in the cab 6. The vehicle body frame 2 has a front frame 2a and a rear frame 2b. The front frame 2a and the rear frame 2b are attached to each other in a manner that allows swinging in the left-right direction. In the present exemplary embodiment, front, rear, left, and right refer to the front, rear, left, and right directions as seen from an operator inside the cab 6.

The work implement 3 is attached to the front frame 2a. The cab 6 is disposed on the rear frame 2b. An engine room 7 is disposed on the rear frame 2b. The engine room 7 is disposed to the rear of the cab 6. A hydraulic fluid tank 8 is disposed between the engine room 7 and the cab 6 in the vehicle front-back direction.

The work vehicle 1 has a steering cylinder 15. The steering cylinder 15 is attached to the front frame 2a and the rear frame 2b. The steering cylinder 15 is a hydraulic cylinder. The work vehicle 1 is able to change the advancing direction to the right and left with the extension and contraction of the steering cylinder 15.

Figure 2:
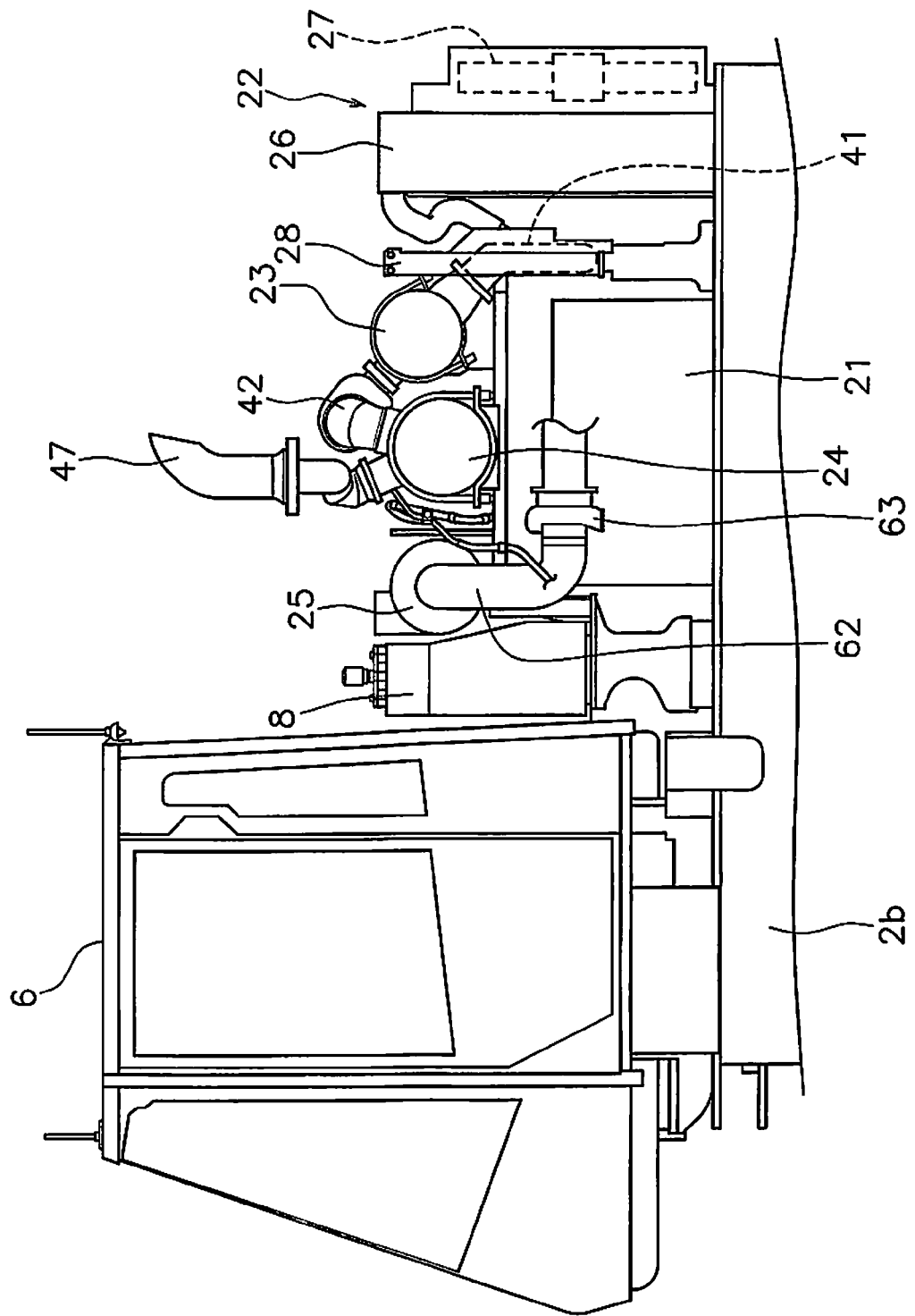
FIG. 2 is a side view depicting a configuration of the inside of an engine room.
Figure 3:
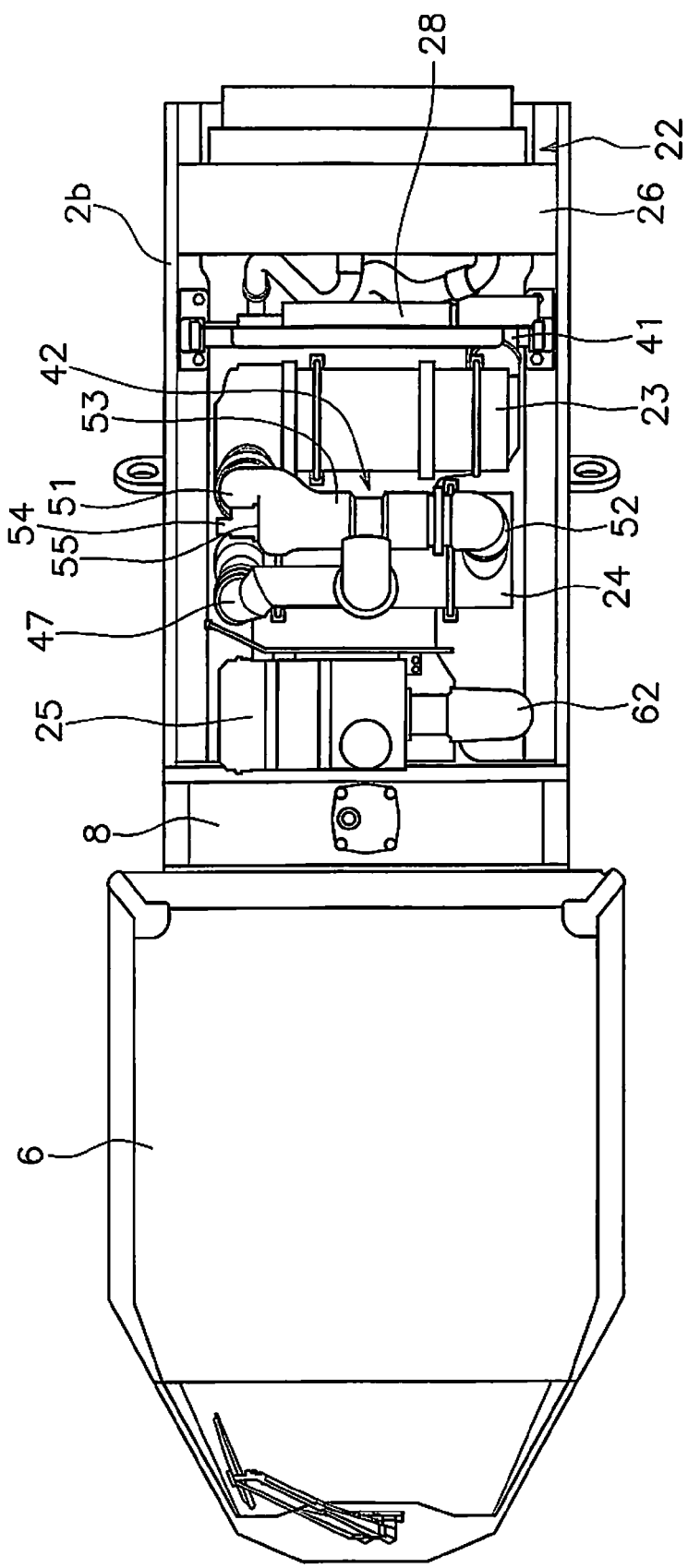
FIG. 3 is a plan view depicting a configuration of the inside the engine room.

FIG. 2 is a side view of a configuration of the inside of the engine room 7. FIG. 3 is a plan view of a configuration of the inside of the engine room 7. As illustrated in FIGS. 2 and 3, an engine 21, a cooling device 22, a first exhaust processing device 23, a second exhaust processing device 24, and an air cleaner 25 are disposed inside the engine room 7.

The engine 21 drives the above mentioned traveling wheels 4 and 5 and the hydraulic pump. The engine 21 is supported by the rear frame 2b. The cooling device 22 has a radiator 26 and a fan 27. The radiator 26 cools cooling liquid for the engine 21. The fan 27 generates an air flow that flows through the radiator 26 toward the rear of the radiator 26. A partition wall 28 is disposed between the cooling device 22 and the engine 21. The partition wall 28 is disposed to the rear of the engine 21. The cooling device 22 is disposed to the rear of the partition wall 28. As illustrated in FIG. 1, a discharge port 29 is provided on the rear surface of the engine room 7. Air that passes through the radiator 26 is exhausted to the rear from the discharge port 29 in the rear surface of the engine room 7.

The first exhaust processing device 23 is disposed over the engine 21. The first exhaust processing device 23 is, for example, a DPF device. The first exhaust processing device 23 has a substantially cylindrical shape. The first exhaust processing device 23 is disposed so that the center axis of the first exhaust processing device 23 extends in the vehicle width direction. The first exhaust processing device 23 is disposed so that the longitudinal direction of the first exhaust processing device 23 extends in the vehicle width direction. The first exhaust processing device 23 is connected to the engine 21 via a first connecting pipe 41.

The second exhaust processing device 24 is disposed in front of the first exhaust processing device 23 over the engine 21. The second exhaust processing device 24 is, for example, a SCR device. The second exhaust processing device 24 has a substantially cylindrical shape. The second exhaust processing device 24 is disposed so that the center axis of the second exhaust processing device 24 extends in the vehicle width direction. The second exhaust processing device 24 is disposed so that the longitudinal direction of the second exhaust processing device 24 extends in the vehicle width direction. The second exhaust processing device 24 is connected to the first exhaust processing device 23 via a second connecting pipe 42.

The second connecting pipe 42 is disposed over the second exhaust processing device 24. At least a portion of the second connecting pipe 42 overlaps the second exhaust processing device 24 as seen in a plan view. At least a portion of the second connecting pipe 42 is positioned below the uppermost part of the first exhaust processing device 23.

As illustrated in FIG. 3, the second connecting pipe 42 has a first connecting end part 51, a second connecting end part 52, and a middle pipe part 53. The first connecting end part 51 is connected to the first exhaust processing device 23. The second connecting end part 52 is connected to the second exhaust processing device 24. The middle pipe part 53 is positioned between the first connecting end part 51 and the second connecting end part 52. The middle pipe part 53 extends in the vehicle width direction.

A reducing agent injection device 54 is attached to the second connecting pipe 42. The reducing agent injection device 54 injects a reducing agent such as a urea water into the second connecting pipe 42. Specifically, the second connecting pipe 42 includes a recessed part 55. The recessed part 55 is positioned between the first connecting end part 51 and the middle pipe part 53. The reducing agent injection device 54 is attached to the recessed part 55.

An exhaust pipe 47 is connected to the second exhaust processing device 24. The exhaust pipe 47 is positioned over the second exhaust processing device 24. The exhaust pipe 47 extends in the vehicle width direction over the second exhaust processing device 24 and bends upward. As illustrated in FIG. 1, the distal end part of the exhaust pipe 47 protrudes upward the upper surface of the engine room 7. The distal end part of the exhaust pipe 47 bends toward the rear.

The air cleaner 25 is disposed in front of the second exhaust processing device 24 inside the engine room 7. The air cleaner 25 is disposed so that the center axis of the air cleaner 25 extends in the vehicle width direction. The air cleaner 25 is disposed so that the longitudinal direction of the air cleaner 25 extends in the vehicle width direction.

The first exhaust processing device 23, the second exhaust processing device 24, and the middle pipe part 53 are not necessarily disposed parallel to each other. The center axes of each of the first exhaust processing device 23, the second exhaust processing device 24, and the middle pipe part 53 do not necessarily extend in the vehicle width direction. For example, the center axes may extend in the front-back direction. Alternatively, the respective center axes may be inclined with respect to the vehicle width direction.

The center axis of the middle pipe part 53 may not be positioned above the respective center axes of the first exhaust processing device 23 and the second exhaust processing device 24. For example, the respective center axes of the first exhaust processing device 23, the second exhaust processing device 24, and the middle pipe part 53 may be disposed in a row in the horizontal direction.

The air cleaner 25 has a substantially cylindrical shape. An intake pipe 61 illustrated in FIG. 1 is connected to the air cleaner 25. The intake pipe 61 is positioned over the air cleaner 25. The intake pipe 61 extends upward from the air cleaner 25 and protrudes upward from the upper surface of the engine room 7. The intake pipe 61 is disposed forward of the exhaust pipe 47.

An intake connecting pipe 62 is connected to the air cleaner 25. Specifically, the intake connecting pipe 62 is connected to a side surface of the air cleaner 25. The intake connecting pipe 62 extends downward from the air cleaner 25 and extends to the rear under the air cleaner 25. The intake connecting pipe 62 is connected to an intake port (not illustrated) of the engine 21 via a supercharger 63.

The hydraulic fluid tank 8 is disposed in front of the air cleaner 25. The hydraulic fluid tank 8 is disposed between the cab 6 and the air cleaner 25 in the vehicle front-back direction.

Figure 4:
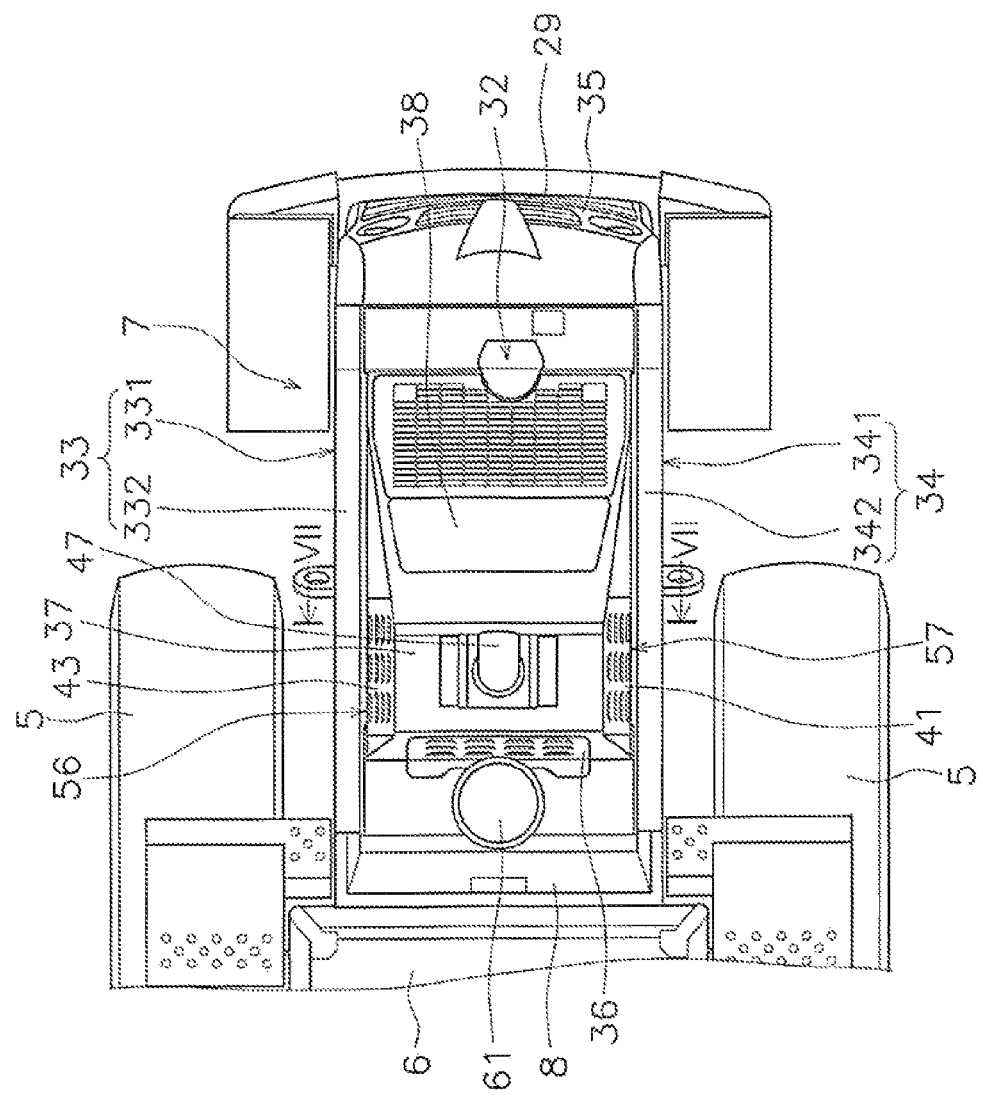
FIG. 4 is a plan view of the engine room.
Figure 5:
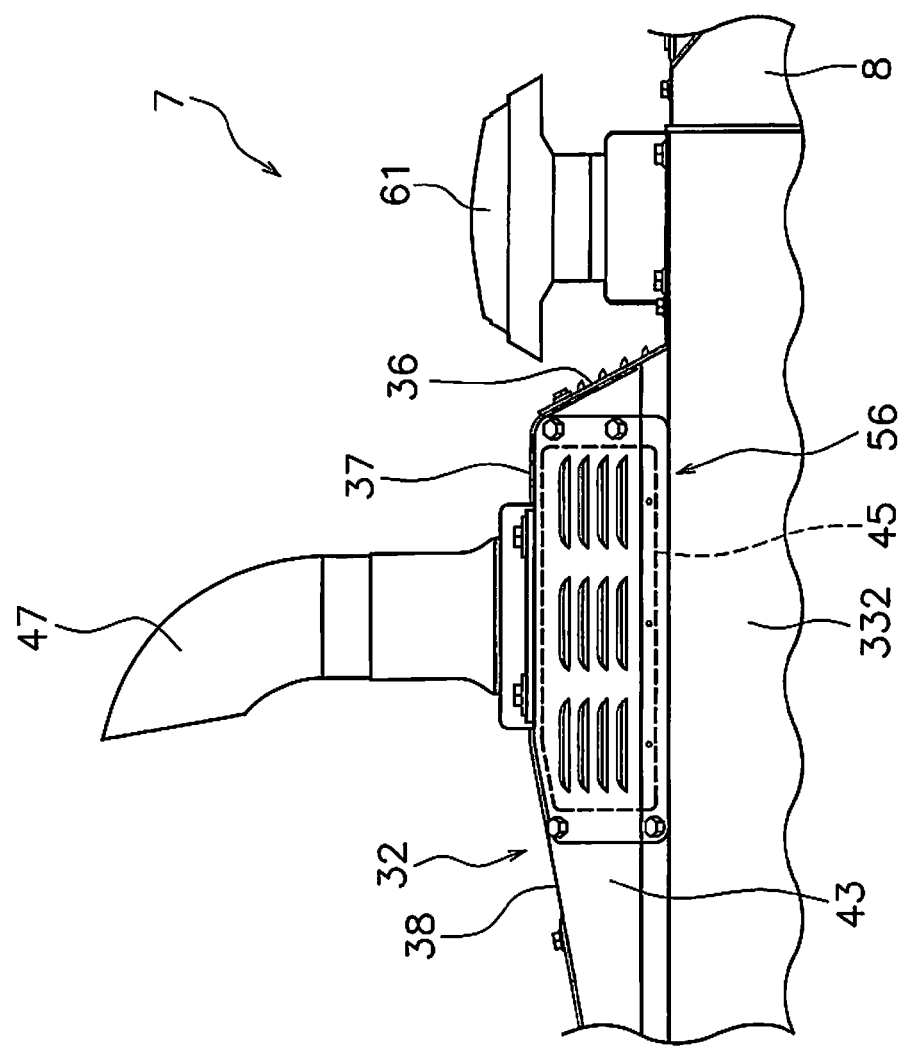
FIG. 5 is a right side view depicting a portion of the engine room.
Figure 6:
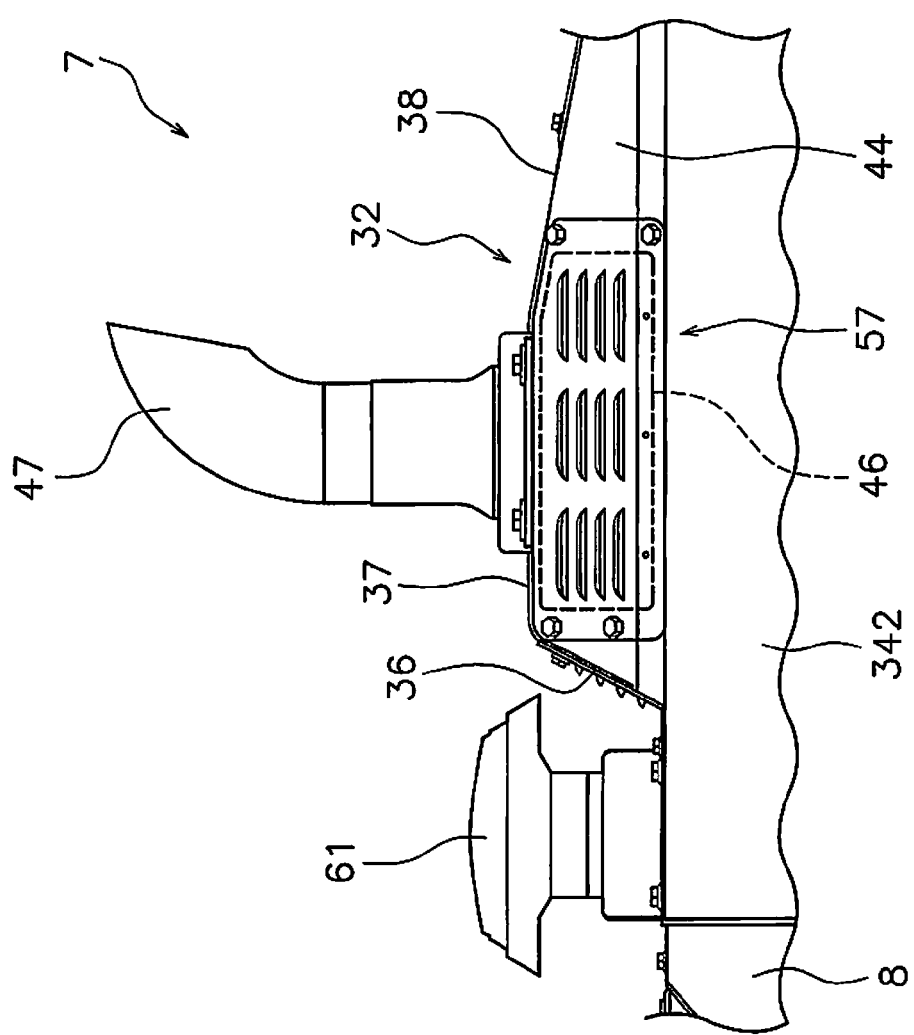
FIG. 6 is a left side view depicting a portion of the engine room.
Figure 7:
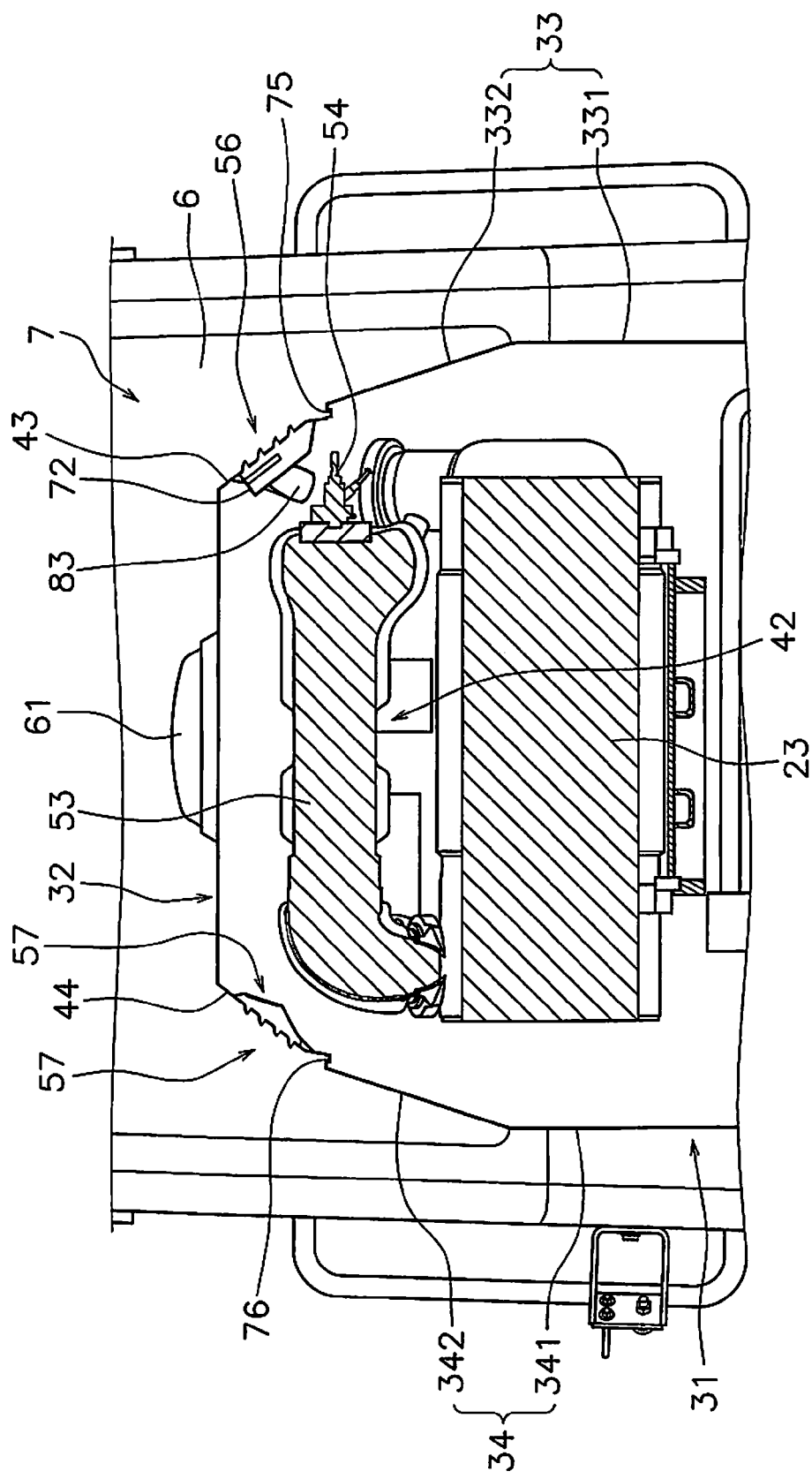
FIG. 7 is a cross-sectional view along line VII-VII in FIG. 4.

Next, the structure of the engine room 7 will be explained. FIG. 4 is a plan view of the engine room 7. FIG. 5 is a right side view depicting a portion of the engine room 7. FIG. 6 is a left side view depicting a portion of the engine room 7. FIG. 7 is a cross-sectional view along line VII-VII in FIG. 4. The insides of the first exhaust processing device 23 and the second connecting pipe 42 are cross-hatched in FIG. 7 and a detailed illustration of the internal structures thereof is omitted.

As illustrated in FIG. 1, the engine room 7 has a vehicle body cover, such as a main body cover 31 and a ceiling cover 32. The main body cover 31 and the ceiling cover 32 are exterior covers. The main body cover 31 accommodates the above mentioned engine 21. The main body cover 31 has a rear cover 35. The above mentioned discharge port 29 is provided in the rear cover 35.

As illustrated in FIGS. 4 and 7, the main body cover 31 has a first side cover 33 and a second side cover 34. The first side cover 33 is the right side surface of the engine room 7 and the second side cover 34 is the left side surface of the engine room 7 in the present exemplary embodiment. However, the left side surface of the engine room 7 may be the first side cover and the right side surface of the engine room 7 may be the second side cover.

As illustrated in FIG. 7, the first side cover 33 has a main body side cover part 331 and an upper side cover part 332. The main body side cover part 331 extends in the up-down direction. The main body side cover part 331 is positioned below the uppermost parts of the first exhaust processing device 23 and the second exhaust processing device 24.

The upper side cover part 332 is disposed over the main body side cover part 331. The upper side cover part 332 is connected to the upper edge of the main body side cover part 331. The main body side cover part 331 may be integrated with the upper side cover part 332 or may be separate from the upper side cover part 332. The upper side cover part 332 is inclined with respect to the vertical direction. The upper side cover part 332 is inclined upward toward the inside. The upper edge of the upper side cover part 332 is positioned above the uppermost parts of the first exhaust processing device 23 and the second exhaust processing device 24. The upper edge of the upper side cover part 332 is positioned below the uppermost part of the second connecting pipe 42.

The second side cover 34 has a shape that substantially exhibits right-left symmetry with the first side cover 33. The second side cover 34 has a main body side cover part 341 and an upper side cover part 342. The main body side cover part 341 of the second side cover 34 substantially exhibits right-left symmetry with the main body side cover part 331 of the first side cover 33. The upper side cover part 342 of the second side cover 34 substantially exhibits right-left symmetry with the upper side cover part 332 of the first side cover 33. Therefore, a detailed explanation of the main body side cover part 341 and the upper side cover part 342 of the second side cover 34 is omitted.

The right and left side surfaces of the hydraulic fluid tank 8 depicted in FIG. 1 are flush with the first side cover 33 and the second side cover 34. Therefore, the upper parts of the left and right side surfaces of the hydraulic fluid tank 8 are inclined with respect to the vertical direction in the same way as the upper side cover parts 332 and 342.

The ceiling cover 32 is disposed over the main body cover 31. The ceiling cover 32 is attached in a detachable manner to the main body cover 31. As illustrated in FIGS. 5 and 6, the ceiling cover 32 has a front surface part 36, a top surface part 37, and a rear surface part 38. The front surface part 36 is disposed to the rear of the distal end part of the intake pipe 61. The front surface part 36 is inclined with respect to the vertical direction. Specifically, the front surface part 36 is inclined upward and toward the rear.

The top surface part 37 is disposed between the front surface part 36 and the rear surface part 38 in the vehicle front-back direction. The top surface part 37 is disposed in a substantially horizontal manner. The distal end part of the exhaust pipe 47 protrudes upward from the top surface part 37. The rear surface part 38 is disposed to the rear of the top surface part 37. The rear surface part 38 is inclined with respect to the vertical direction. Specifically, the rear surface part 38 is inclined downward and toward the rear.

As illustrated in FIG. 5, the ceiling cover 32 has a first side surface part 43. As illustrated in FIG. 6, the ceiling cover 32 has a second side surface part 44. The first side surface part 43 is the right side surface of the ceiling cover 32 and the second side surface part 44 is the left side surface of the ceiling cover 32 in the present exemplary embodiment. However, the left side surface of the ceiling cover 32 may be the first side surface and the right side surface of the ceiling cover 32 may be the second side surface.

As illustrated in FIG. 5, the first side surface part 43 is disposed over the upper side cover part 332. The first side surface part 43 has a first opening 45. A first ventilation cover unit 56 is attached to the first opening 45. The first ventilation cover unit 56 is described below.

As illustrated in FIG. 7, the first side surface part 43 is inclined with respect to the vertical direction. Specifically, the first side surface part 43 is inclined upward and toward the inside. The inclination angle with respect to the vertical direction of the first side surface part 43 is preferably greater than the inclination angle with respect to the vertical direction of the upper side cover part 332. The lower edge of the first side surface part 43 is positioned below the uppermost part of the second connecting pipe 42. The upper edge of the first side surface part 43 is positioned above the uppermost part of the second connecting pipe 42.

As illustrated in FIG. 6, the second side surface part 44 has a second opening 46. A second ventilation cover unit 57 is attached to the second opening 46. The second ventilation cover unit 57 is described below. The second side surface part 44 has a shape that substantially exhibits right-left symmetry with the first side surface part 43. Therefore, a detailed explanation of the second side surface part 44 is omitted.

Figure 8:
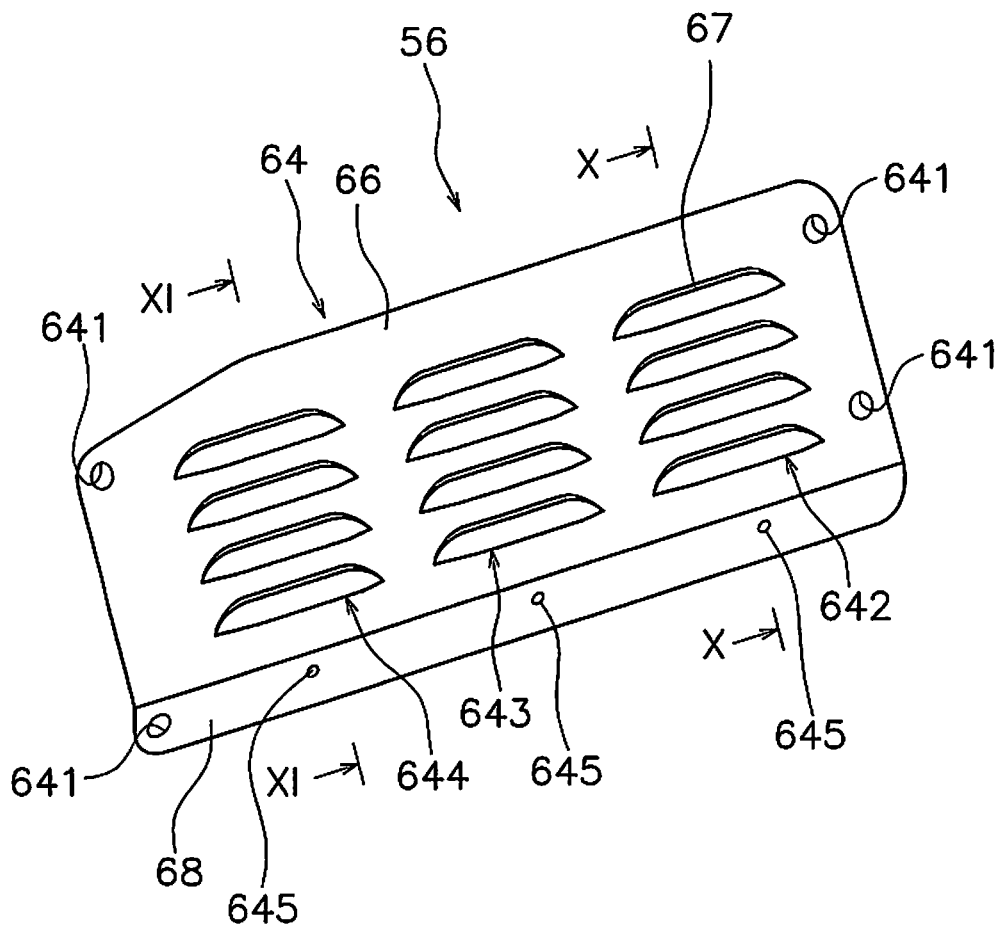
FIG. 8 is a perspective view of a first ventilation cover unit as seen from the outside.
Figure 9:
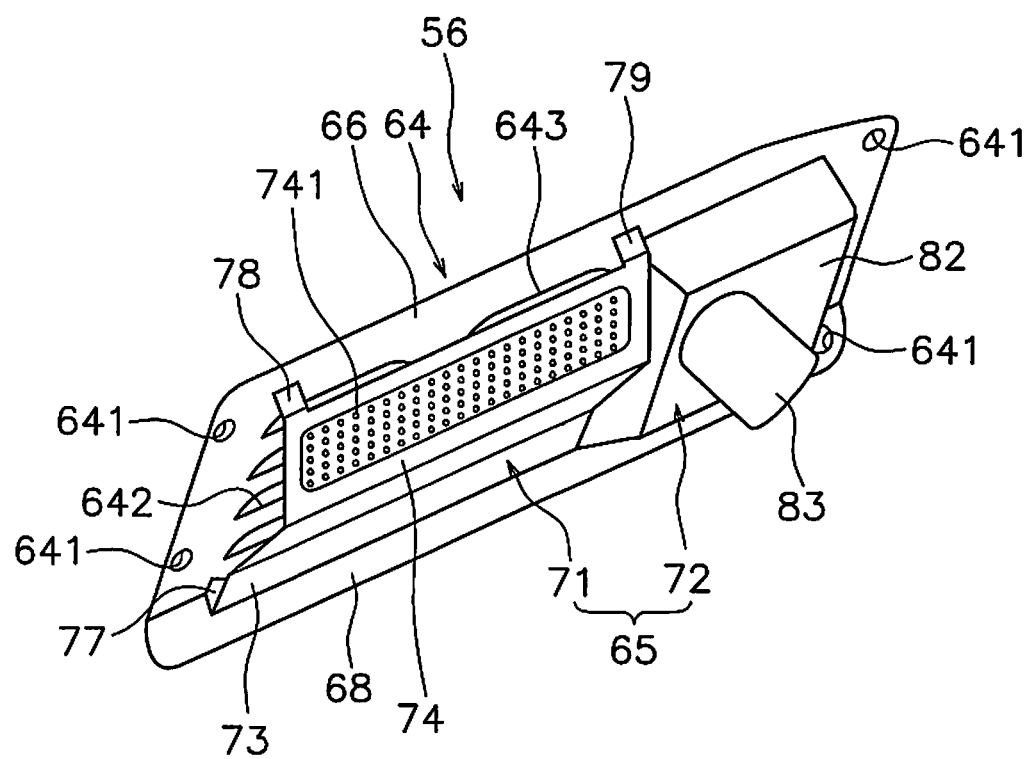
FIG. 9 is a perspective view of the first ventilation cover unit as seen from inside.
Figure 10:
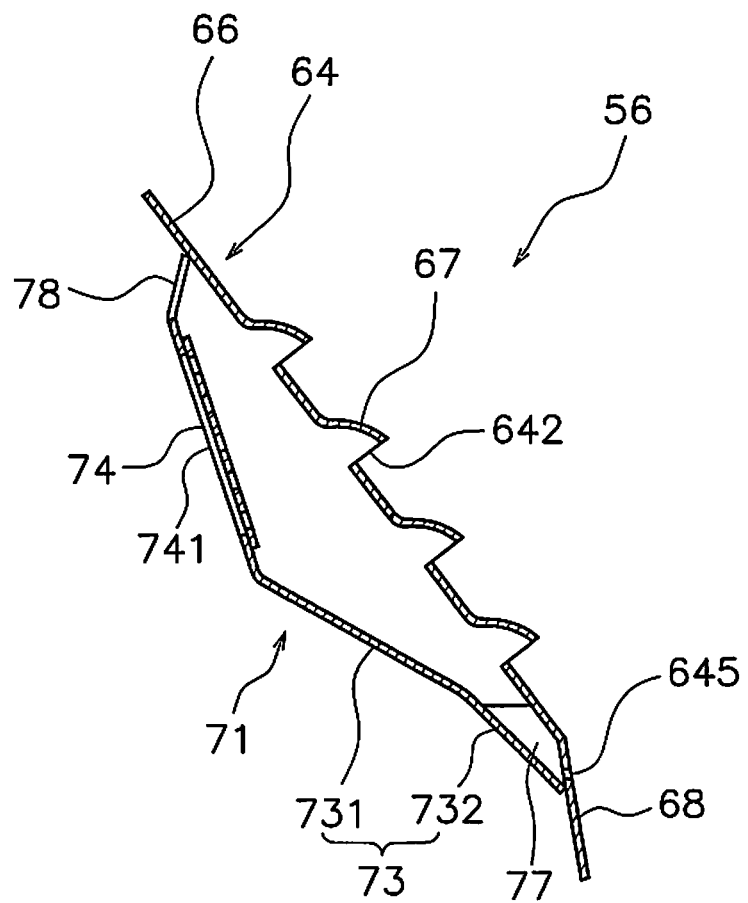
FIG. 10 is a cross-sectional view of the first ventilation cover unit along line X-X in FIG. 8.
Figure 11:
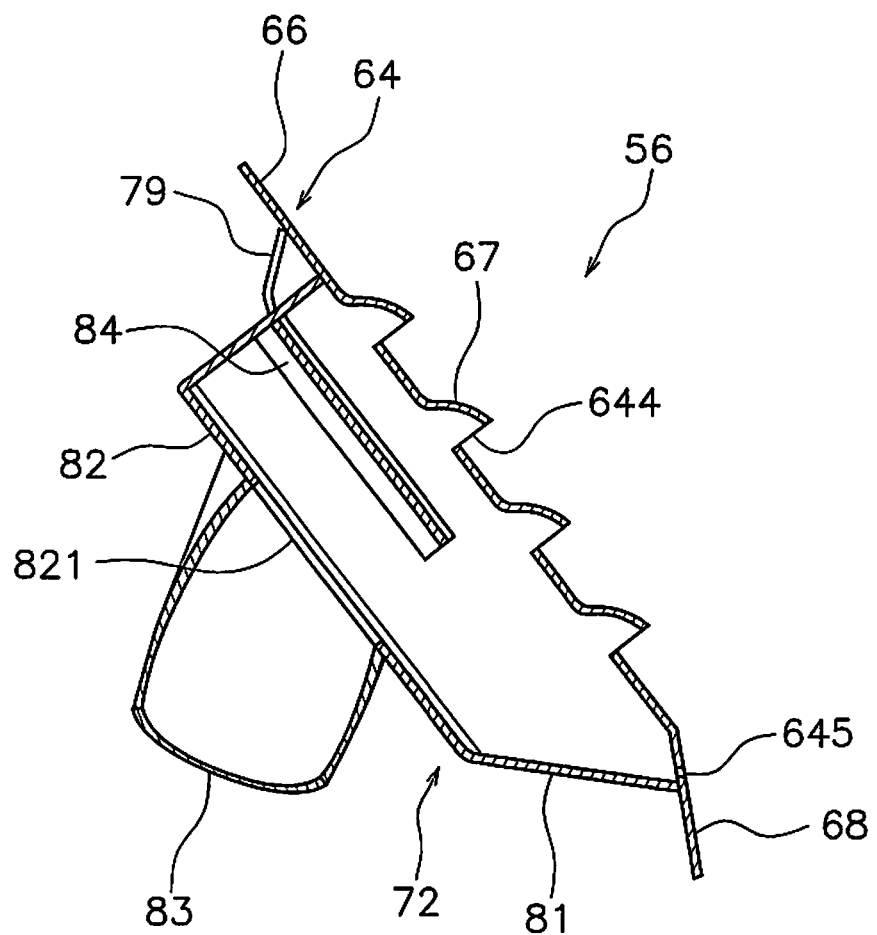
FIG. 11 is a cross-sectional view of the first ventilation cover unit along line XI-XI in FIG. 8.

The first ventilation cover unit 56 is described next. The first ventilation cover unit 56 is attached to the first side surface part 43 and closes the first opening 45. The first ventilation cover unit 56 is attached to the first side surface part 43 in a detachable manner. For example, the first ventilation cover unit 56 is attached to the first side surface part 43 with a fastening member, such as a bolt. FIG. 8 is a perspective view of the first ventilation cover unit 56 as seen from the outside. FIG. 9 is a perspective view of the first ventilation cover unit 56 as seen from the inside. FIG. 10 is a cross-sectional view of the first ventilation cover unit along line X-X in FIG. 8. FIG. 11 is a cross-sectional view of the first ventilation cover unit along line XI-XI in FIG. 8. As illustrated in FIG. 9, the first ventilation cover unit 56 has a first outside ventilation cover part 64 and a first inside ventilation cover part 65. The first outside ventilation cover part 64 and the first inside ventilation cover part 65 are integrated with each other.

The first outside ventilation cover part 64 is attached to the first side surface part 43 in a detachable manner. Holes 641 through which fastening members can pass are provided in the first outside ventilation cover part 64. The first outside ventilation cover part 64 is disposed in an inclined manner with respect to the vertical direction. The first outside ventilation cover part 64 is attached flush to the first side surface part 43. Therefore, the inclination angle of the first outside ventilation cover part 64 is the same as the inclination angle of the first side surface part 43. As illustrated in FIGS. 8 to 11, the first outside ventilation cover part 64 has a plurality of outside ventilation holes 642, 643, and 644.

The outside ventilation holes 642, 643, and 644 allow communication between the outside and the inside of the first outside ventilation cover part 64. The outside ventilation holes 642, 643, and 644 have a slotted shape that extends in the vehicle front-back direction. Specifically, the plurality of outside ventilation holes 642, 643, and 644 have a plurality of first outside ventilation holes 642, a plurality of second outside ventilation holes 643, and a plurality of third outside ventilation holes 644. The first outside ventilation holes 642, the second outside ventilation holes 643, and the third outside ventilation holes 644 are disposed in a row in the vehicle front-back direction. The plurality of first outside ventilation holes 642 are disposed in a row in the up-down direction. The plurality of second outside ventilation holes 643 are disposed in a row in the up-down direction. The plurality of third outside ventilation holes 644 are disposed in a row in the up-down direction.

The reference numeral 642 is attached to only one of the plurality of first outside ventilation holes 642 in the drawings, and reference numerals are omitted for the other first outside ventilation holes 642. The reference numeral 643 is attached to only one of the plurality of second outside ventilation holes 643 in the drawings, and reference numerals are omitted for the other second outside ventilation holes 643. The reference numeral 644 is attached to only one of the plurality of third outside ventilation holes 644 in the drawings, and reference numerals are omitted for the other third outside ventilation holes 644.

As illustrated in FIG. 8, the first outside ventilation cover part 64 has an inclined surface part 66 and a plurality of eave parts 67. The inclined surface part 66 includes the plurality of outside ventilation holes 642, 643, and 644. The inclined surface part 66 is attached flush to the first side surface part 43. The eave parts 67 cover the outside ventilation holes 642, 643, and 644 from the outside. The eave parts 67 protrude to the outside from the inclined surface part 66. The inclined surface part 66 and the eave parts 67 are formed in an integrated manner. The eave parts 67 are formed by subjecting a single plate to pressing for example. The reference numeral 67 is attached to only one of the plurality of eave parts 67 in the drawings, and reference numerals are omitted for the other eave parts 67.

The first outside ventilation cover part 64 has a lower side surface part 68. The lower side surface part 68 is positioned under the inclined surface part 66. The lower side surface part 68 is connected to the inclined surface part 66. The first outside ventilation cover part 64 has a shape that is bent between the lower side surface part 68 and the inclined surface part 66. The inclination angle with respect to the vertical direction of the lower side surface part 68 may be less than the inclination angle with respect to the vertical direction of the inclined surface part 66. The inclination angle with respect to the vertical direction of the lower side surface part 68 is the same as the inclination angle with respect to the vertical direction of the upper side cover part 332 of the above mentioned first side cover 33.

As illustrated in FIG. 9, the first inside ventilation cover part 65 is attached to the inner surface of the first outside ventilation cover part 64. The first inside ventilation cover part 65 is disposed facing the outside ventilation holes 642, 643, and 644 of the first outside ventilation cover part 64 on the inside of the first outside ventilation cover part 64. The first inside ventilation cover part 65 has a perforated plate member 71 and a spot cooling member 72. "Inside" refers to the direction toward the inside of the vehicle body.

The perforated plate member 71 is disposed to cover a portion of the outside ventilation holes 642, 643, and 644 on the inside of the first outside ventilation cover part 64. The spot cooling member 72 is disposed to cover the remainder of the outside ventilation holes 642, 643, and 644 on the inside of the first outside ventilation cover part 64. Specifically, the perforated plate member 71 is disposed to cover the plurality of first outside ventilation holes 642 and the plurality of second outside ventilation holes 643 on the inside of the first outside ventilation cover part 64. As illustrated in FIG. 11, the spot cooling member 72 is disposed to cover the plurality of third outside ventilation holes 644 on the inside of the first outside ventilation cover part 64.

As illustrated in FIG. 10, the perforated plate member 71 has a rain gutter part 73 and a ventilation part 74. The rain gutter part 73 is configured to receive water that enters from the first outside ventilation holes 642 and the second outside ventilation holes 643. The rain gutter part 73 is disposed to overlap the first outside ventilation holes 642 and the second outside ventilation holes 643 as seen in a plan view. The rain gutter part 73 is disposed to be inclined downward toward the first outside ventilation cover part 64. The lower edge part of the rain gutter part 73 is connected to the first outside ventilation cover part 64. Specifically, the lower edge part of the rain gutter part 73 is connected to the lower side surface part 68 of the first outside ventilation cover part 64.

The rain gutter part 73 has an upper rain gutter part 731 and a lower rain gutter part 732. The lower edge part of the upper rain gutter part 731 is connected to the upper edge part of the lower rain gutter part 732. The rain gutter part 73 has a shape that bends between the upper rain gutter part 731 and the lower rain gutter part 732. The upper rain gutter part 731 and the lower rain gutter part 732 are disposed to be inclined downward toward the first outside ventilation cover part 64. The inclination angle with respect to the vertical direction of the upper rain gutter part 731 is greater than the inclination angle with respect to the vertical direction of the lower rain gutter part 732.

The above mentioned first outside ventilation cover part 64 has a draining hole 645 that communicates with a space between the rain gutter part 73 and the first outside ventilation cover part 64. The draining hole 645 communicates with a space between the first outside ventilation cover part 64 and the rain gutter part 73. The draining hole 645 is disposed to face the rain gutter part 73. Specifically, the draining hole 645 is disposed to face the lower rain gutter part 732.

As illustrated in FIG. 7, a groove 75 that extends in the vehicle front-back direction is provided between the first side cover 33 and the first side surface part 43. The groove 75 is disposed between the first outside ventilation cover part 64 and the first side cover 33. The draining hole 645 is disposed near the groove 75. Water discharged from the draining hole 645 flows through the groove 75 toward the front or the rear of the vehicle. As a result, the first side cover 33 is prevented from becoming dirty due to the water being discharged from the draining hole 645. A groove 76 is similarly provided between the second side cover 34 and the second side surface part 44.

As illustrated in FIG. 10, the ventilation part 74 is disposed above the rain gutter part 73. The lower edge part of the ventilation part 74 is connected to the upper edge part of the rain gutter part 73. The ventilation part 74 has a plurality of inside ventilation holes 741 that communicate with a space on the inside of the first inside ventilation cover part 65. For example, the plurality of inside ventilation holes 741 are punched holes that are punctured in the plate-like ventilation part 74. The ventilation part 74 is disposed to overlap the first outside ventilation holes 642 and the second outside ventilation holes 643 as seen in a horizontal view. The reference numeral 741 is attached to only one of the plurality of inside ventilation holes 741 in the drawings, and reference numerals are omitted for the other inside ventilation holes 741.

The ventilation part 74 is inclined with respect to the vertical direction. The ventilation part 74 is disposed to be inclined downward toward the first outside ventilation cover part 64. The inclination angle with respect to the vertical direction of the ventilation part 74 is smaller than the inclination angle with respect to the vertical direction of the upper rain gutter part 731. Therefore, the first inside ventilation cover part 65 has a shape that is bent between the ventilation part 74 and the rain gutter part 73.

As illustrated in FIG. 9, the space between the first outside ventilation cover part 64 and the first inside ventilation cover part 65 is open at the side surfaces of the first outside ventilation cover part 64 and the first inside ventilation cover part 65. However, the lower part of the opening on the side surfaces of the first outside ventilation cover part 64 and the first inside ventilation cover part 65 is closed by a closing member 77. Specifically as illustrated in FIG. 10, the side of the space between the first outside ventilation cover part 64 and the lower rain gutter part 732 is closed by the closing member 77. The closing member 77 may be formed in an integrated manner with the rain gutter part 73 by a bending process.

As illustrated in FIG. 9, the first inside ventilation cover part 65 has a first connecting part 78 and a second connecting part 79. The first connecting part 78 and the second connecting part 79 are connected to the first outside ventilation cover part 64. The first connecting part 78 and the second connecting part 79 protrude from the upper edge part of the ventilation part 74. The first connecting part 78 and the second connecting part 79 are disposed at an interval in the vehicle front-back direction. As a result, the space between the first outside ventilation cover part 64 and the first inside ventilation cover part 65 opens upward between the first connecting part 78 and the second connecting part 79.

As illustrated in FIG. 11, the spot cooling member 72 has a rain gutter part 81 and a ventilation part 82. The rain gutter part 81 is configured so as to receive water that enters from the third outside ventilation holes 644. The rain gutter part 81 is disposed to overlap the third outside ventilation holes 644 as seen in a plan view. The rain gutter part 81 is disposed to be inclined downward toward the first outside ventilation cover part 64. The lower edge part of the rain gutter part 81 is connected to the first outside ventilation cover part 64. Specifically, the lower edge part of the rain gutter part 81 is connected to the lower side surface part 68 of the first outside ventilation cover part 64. The rain gutter part 81 is disposed to face the above mentioned draining hole 645. The draining hole 645 communicates with the space between the first outside ventilation cover part 64 and the rain gutter part 81.

The ventilation part 82 is disposed above the rain gutter part 81. The lower edge part of the ventilation part 82 is connected to the upper edge part of the rain gutter part 81. The ventilation part 82 is disposed to overlap the third outside ventilation holes 644 as seen in the horizontal direction. The ventilation part 82 has an inside ventilation hole 821 that communicates with the space on the inside of the first inside ventilation cover part 65. The number of inside ventilation holes 821 in the spot cooling member 72 in the present exemplary embodiment is one. The inside ventilation hole 821 of the spot cooling member 72 is larger than the inside ventilation holes 741 of the perforated plate member 71.

The ventilation part 82 is inclined with respect to the vertical direction. The ventilation part 82 is disposed to be inclined downward toward the first outside ventilation cover part 64. The inclination angle with respect to the vertical direction of the ventilation part 82 is smaller than the inclination angle with respect to the vertical direction of the rain gutter part 81. The ventilation part 82 of the spot cooling member 72 is longer in the up-down direction than the ventilation part 74 of the perforated plate member 71.

The spot cooling member 72 has a guiding member 83. The guiding member 83 is connected to the inside ventilation hole 821. The guiding member 83 protrudes to the inside of the first inside ventilation cover part 65 from the ventilation part 82. The guiding member 83 has a tube-like shape. The guiding member 83 guides the flow of air that passes through the inside ventilation hole 821 into the engine room 7. Specifically as illustrated in FIGS. 4 and 7, the guiding member 83 is disposed to face a reducing agent injection device 54. The guiding member 83 guides the flow of air from the inside ventilation hole 821 toward the reducing agent injection device 54.

The spot cooling member 72 has a plate-like member (baffle plate) 84. The plate-like member 84 is positioned between the spot cooling member 72 and the first outside ventilation cover part 64 and is disposed between the third outside ventilation holes 644 and the inside ventilation hole 821. The plate-like member 84 is disposed over the inside ventilation hole 821. The plate-like member 84 overlaps the inside ventilation hole 821 as seen in a plan view.

The spot cooling member 72 closes the upward, downward and both side directions of the space between the spot cooling member 72 and the first outside ventilation cover part 64. Therefore, the space between the spot cooling member 72 and the first outside ventilation cover part 64 communicates with the space inside the engine room 7 through only the inside ventilation hole 821.

Figure 12:
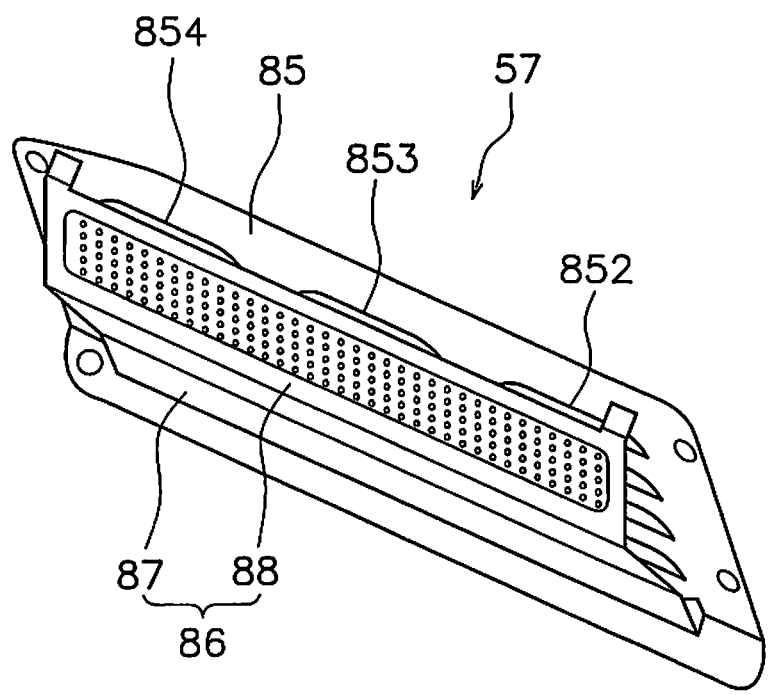
FIG. 12 is a perspective view of a second ventilation cover unit as seen from the inside.

As illustrated in FIG. 6, the second ventilation cover unit 57 is attached to the second side surface part 44 and closes a second opening 46. The second ventilation cover unit 57 is attached to the second side surface part 44 in a detachable manner. For example, the second ventilation cover unit 57 is attached to the second side surface part 44 with a fastening member, such as a bolt. FIG. 12 is a perspective view of the second ventilation cover unit 57 as seen from the inside. The second ventilation cover unit 57 has a second outside ventilation cover part 85 and a second inside ventilation cover part 86. The second outside ventilation cover part 85 and the second inside ventilation cover part 86 are integrated with each other.

The second outside ventilation cover part 85 has a plurality of outside ventilation holes 852, 853, and 854. Specifically, the second outside ventilation cover part 85 has a plurality of first outside ventilation holes 852, a plurality of second outside ventilation holes 853, and a plurality of third outside ventilation holes 854. The plurality of first outside ventilation holes 852, the plurality of second outside ventilation holes 853, and the plurality of third outside ventilation holes 854 in the second outside ventilation cover part 85 correspond respectively to the plurality of first outside ventilation holes 642, the plurality of second outside ventilation holes 643, and the plurality of third outside ventilation holes 644 in the first outside ventilation cover part 64. The second outside ventilation cover part 85 has the same shape as the first outside ventilation cover part 64 except that the shape has left-right symmetry. As a result, a detailed explanation of the second outside ventilation cover part 85 is omitted.

The second inside ventilation cover part 86 does not have the structure corresponding to the spot cooling member 72 of the first inside ventilation cover part 65, but is configured only with the same structure as the perforated plate member 71 of the first inside ventilation cover part 65. The second inside ventilation cover part 86 has a rain gutter part 87 and a ventilation part 88.

The rain gutter part 87 is configured to receive water that enters from the outside ventilation holes 852, 853, and 854. The rain gutter part 87 is configured in the same way as the rain gutter part 73 of the first inside ventilation cover part 65.

The ventilation part 88 is disposed to cover the outside ventilation holes 852, 853, and 854. That is, the ventilation part 88 is disposed to cover the plurality of first outside ventilation holes 852, the plurality of second outside ventilation holes 853, and the plurality of third outside ventilation holes 854 on the inside of the second outside ventilation cover part 85. Other configurations of the second inside ventilation cover part 86 are the same as those of the perforated plate member 71 of the first inside ventilation cover part 65 and a detailed explanation is omitted.

The first side surface part 43 and the first outside ventilation cover part 64 of the ceiling cover 32 in the work vehicle according to the present exemplary embodiment as described above are disposed in an inclined manner with respect to the vertical direction. In particular, the first outside ventilation cover part 64 and the first side surface part 43 of the ceiling cover 32 are inclined to a greater degree than the upper side cover part 332 of the first side cover 33 positioned therebelow. As a result, good visibility to the rear from the cab 6 is achieved.

Outdoor air enters the space between the first outside ventilation cover part 64 and the first inside ventilation cover part 65 from the outside ventilation holes 642, 643, and 644 of the first outside ventilation cover part 64. The outdoor air that enters the space between the first outside ventilation cover part 64 and the perforated plate member 71 from the first outside ventilation holes 642 and the second outside ventilation holes 643 passes through the plurality of inside ventilation holes 741 in the ventilation part 74 and flows into the engine room 7. As a result, the inside of the engine room 7 is ventilated and the temperature inside the engine room 7 can be reduced.

The outdoor air that enters the space between the first outside ventilation cover part 64 and the spot cooling member 72 from the third outside ventilation holes 644 passes through the inside ventilation hole 821 in the ventilation part 82 and is guided by the guiding member 83 toward the reducing agent injection device 54. As a result, the reducing agent injection device 54 can be cooled in a concentrated manner.

Even when water enters from the first outside ventilation holes 642 and the second outside ventilation holes 643, the water is received by the rain gutter part 73. Because the ventilation part 74 is disposed above the rain gutter part 73 in the perforated plate member 71, even when water enters from the first outside ventilation holes 642 and the second outside ventilation holes 643, the water is not able to easily enter through the inside ventilation holes 741 of the ventilation part 74. As a result, the intrusion of water into the engine room 7 can be suppressed.

Similarly, even when water enters from the third outside ventilation holes 644, the water is received by the rain gutter part 81. Because the ventilation part 82 is disposed above the rain gutter part 81 in the spot cooling member 72, even when water enters from the third outside ventilation holes 644, the water is not able to easily enter through the inside ventilation hole 821 of the ventilation part 82. As a result, the intrusion of water into the engine room 7 can be suppressed.

In particular, because the inside ventilation hole 821 of the spot cooling member 72 is large, there is a concern that water can enter easily. However, the plate-like member 84 is disposed between the third outside ventilation holes 644 and the inside ventilation hole 821 in the spot cooling member 72. As a result, even when water enters through the third outside ventilation holes 644, the water is not able to easily enter into the inside ventilation hole 821 due to the plate-like member 84.

The water received by the rain gutter part 73 flows downward along the rain gutter part 73 and is discharged to the outside through the draining hole 645. The water received by the rain gutter part 81 flows downward along the rain gutter part 81 and is discharged to the outside through the draining hole 645. The water discharged from the draining hole 645 is discharged through the groove 75 between the first outside ventilation cover part 64 and the first side cover 33. As a result, the first side cover 33 becoming dirty from water dripping onto the first side cover 33 can be suppressed.

The space between the first outside ventilation cover part 64 and the first inside ventilation cover part 65 is open at the side surfaces of the first outside ventilation cover part 64 and the first inside ventilation cover part 65. As a result, the space between the first outside ventilation cover part 64 and the first inside ventilation cover part 65 can be accessed easily from the openings at the side surfaces of the first outside ventilation cover part 64 and the first inside ventilation cover part 65. Consequently, the maintenance performance of the first ventilation cover unit 56 can be improved.

The first outside ventilation cover part 64 and the first inside ventilation cover part 65 are integrated with each other to configure the first ventilation cover unit 56. As a result, the first inside ventilation cover part 65 and the first outside ventilation cover part 64 can be easily detached from the vehicle by detaching the first ventilation cover unit 56 from the first side surface part 43. As a result, maintenance performance can be improved.

While the above explanation describes effects pertaining to the first outside ventilation cover part 64 and the first inside ventilation cover part 65 of the first ventilation cover unit 56, the same effects are demonstrated with the second outside ventilation cover part 85 and the second inside ventilation cover part 86 of the second ventilation cover unit 57.

Although an exemplary embodiment of the present invention has been described so far, the present invention is not limited to the above exemplary embodiments and various modifications may be made within the scope of the invention.

While the work vehicle 1 is exemplified as a wheel loader in the above embodiment, the work vehicle may also be another work vehicle, such as a hydraulic excavator or a bulldozer.

The first exhaust processing device 23 is exemplified as a DPF device and the second exhaust processing device 24 is exemplified as a SCR device in the above exemplary embodiment. However, exhaust processing devices other than a DPF device or a SCR device may be used as the first exhaust processing device 23 and the second exhaust processing device 24.

The first outside ventilation cover part 64 and the first inside ventilation cover part 65 are not limited to the vehicle body cover of the engine room 7 and may be provided in a vehicle body cover for another portion. The same may be said for the second outside ventilation cover part 85 and the second inside ventilation cover part 86.

The first outside ventilation cover part 64 and the first inside ventilation cover part 65 are not limited to the configuration of the above exemplary embodiment and may be modified. For example, the inclined surface part 66 and the eave parts 67 in the first outside ventilation cover part 64 are not limited to being integrated and may be formed separately. The perforated plate member 71 may be omitted from the first inside ventilation cover part 65. Alternatively, the spot cooling member 72 may be omitted from the first inside ventilation cover part 65. The same may be said for the second outside ventilation cover part 85 and the second inside ventilation cover part 86.

The first outside ventilation cover part 64 may be a portion of the exterior cover. That is, the outside ventilation holes 642, 643, and 644 may be formed directly in the exterior cover and the first inside ventilation cover part 65 may be provided on the inside of the exterior cover. The same may be said for the second outside ventilation cover part 85.

According to the present invention, good ventilation and an improved field of view can be achieved while suppressing the intrusion of water to the inside of the vehicle in the vehicle body cover of the work vehicle.

What is claimed is:

1. A vehicle body cover of a work vehicle, the vehicle body cover comprising:
    an outside ventilation cover part having at least one outside ventilation hole that communicates with an external space, the outside ventilation cover part being disposed in an inclined manner with respect to a vertical direction of the work vehicle; and
    an inside ventilation cover part disposed to face the at least one outside ventilation hole on an inside of the outside ventilation cover part;
    the inside ventilation cover part including
        a rain gutter part configured to receive water that enters from the at least one outside ventilation hole; and
        a ventilation part having at least one inside ventilation hole that communicates with a first space on an inside of the inside ventilation cover part, the ventilation part being disposed above the rain gutter part, the ventilation part being arranged and configured such that at least a portion of the at least one inside ventilation hole is at the same height in the vertical direction as at least a portion of the at least one outside ventilation hole.

2. The vehicle body cover of the work vehicle according to claim 1, wherein
    the outside ventilation cover part includes
        an inclined surface part that includes the at least one outside ventilation hole, and
        an eave part that covers the at least one outside ventilation hole from an outside of the vehicle body cover.

3. The vehicle body cover of the work vehicle according to claim 2, wherein
    the inclined surface part and the eave part are formed in an integrated manner.

4. The vehicle body cover of the work vehicle according to claim 1, wherein
    the rain gutter part is disposed to overlap the at least one outside ventilation hole as seen in a plan view.

5. The vehicle body cover of the work vehicle according to claim 1, wherein
    the ventilation part is disposed to overlap the at least one outside ventilation hole as seen in a horizontal view.

6. A vehicle body cover of a work vehicle, the vehicle body cover comprising:
    an outside ventilation cover part having at least one outside ventilation hole that communicates with an external space, the outside ventilation cover part being disposed in an inclined manner with respect to a vertical direction of the work vehicle; and
    an inside ventilation cover part disposed to face the outside ventilation hole on an inside of the outside ventilation cover part;
    the inside ventilation cover part including
        a rain gutter part configured to receive water that enters from the outside ventilation hole; and
        a ventilation part having at least one inside ventilation hole that communicates with a first space on an inside of the inside ventilation cover part, the ventilation part being disposed above the rain gutter part,
    the at least one outside ventilation cover part having a draining hole that passes through the outside ventilation cover part and communicates with a second space between the rain gutter part and the outside ventilation cover part, the draining hole being positioned lower than the at least one outside ventilation hole in the vertical direction.

7. The vehicle body cover of the work vehicle according to claim 1, wherein
    the rain gutter part is disposed to be inclined downward toward the outside ventilation cover part.

8. The vehicle body cover of the work vehicle according to claim 1, wherein
    the first space between the outside ventilation cover part and the inside ventilation cover part is open at the side surfaces of the outside ventilation cover part and the inside ventilation cover part.

9. The vehicle body cover of the work vehicle according to claim 1, wherein
    the at least one inside ventilation hole is a plurality the inside ventilation holes.

10. The vehicle body cover of the work vehicle according to claim 1, wherein
    the inside ventilation cover part further has a guiding member connected to the at least one inside ventilation hole; and the guiding member guides a flow of air that passes through the at least one inside ventilation hole to the inside of the inside ventilation cover part.

11. The vehicle body cover of the work vehicle according to claim 1, further comprising
a plate-like member disposed between the at least one outside ventilation hole and the at least one inside ventilation hole.

12. The vehicle body cover of the work vehicle according to claim 1, further comprising
a first exterior cover having an opening, disposed in an inclined manner with respect to the vertical direction, and being a separate body from the outside ventilation cover part,
the outside ventilation cover part and the inside ventilation cover part provided in an integrated manner with each other to be configured as a ventilation cover unit;
the ventilation cover unit being attached to the first exterior cover and closing the opening.

13. The vehicle body cover of the work vehicle according to claim 1, further comprising
a second exterior cover disposed under the outside ventilation cover part and disposed in an inclined manner with respect to the vertical direction,
the inclination angle with respect to the vertical direction of the outside ventilation cover part being greater than the inclination angle with respect to the vertical direction of the second exterior cover.

14. A work vehicle comprising the vehicle body cover according to claim 1.

15. The work vehicle according to claim 14, further comprising a cab;
an engine room having the vehicle body cover and disposed to the rear of the cab;
an engine disposed inside the engine room;
a first exhaust processing device disposed over the engine; and
a second exhaust processing device disposed over the engine.

16. A vehicle body cover of a work vehicle, the vehicle body cover comprising:
an outside ventilation cover part having at least one outside ventilation hole that communicates with an external space, the outside ventilation cover part being disposed in an inclined manner with respect to a vertical direction of the work vehicle, the at least one outside ventilation hole having an eave part configured such that the at least one outside ventilation hole opens downward and outward from an inside of the outside ventilation cover part to the external space; and
an inside ventilation cover part disposed to face the outside ventilation hole on an inside of the outside ventilation cover part;
the inside ventilation cover part including
a rain gutter part configured to receive water that enters from the outside ventilation hole; and
a ventilation part having an inside ventilation hole that communicates with a first space on an inside of the inside ventilation cover part, the ventilation part being disposed above the rain gutter part.

* * * * *